Patented Oct. 13, 1942

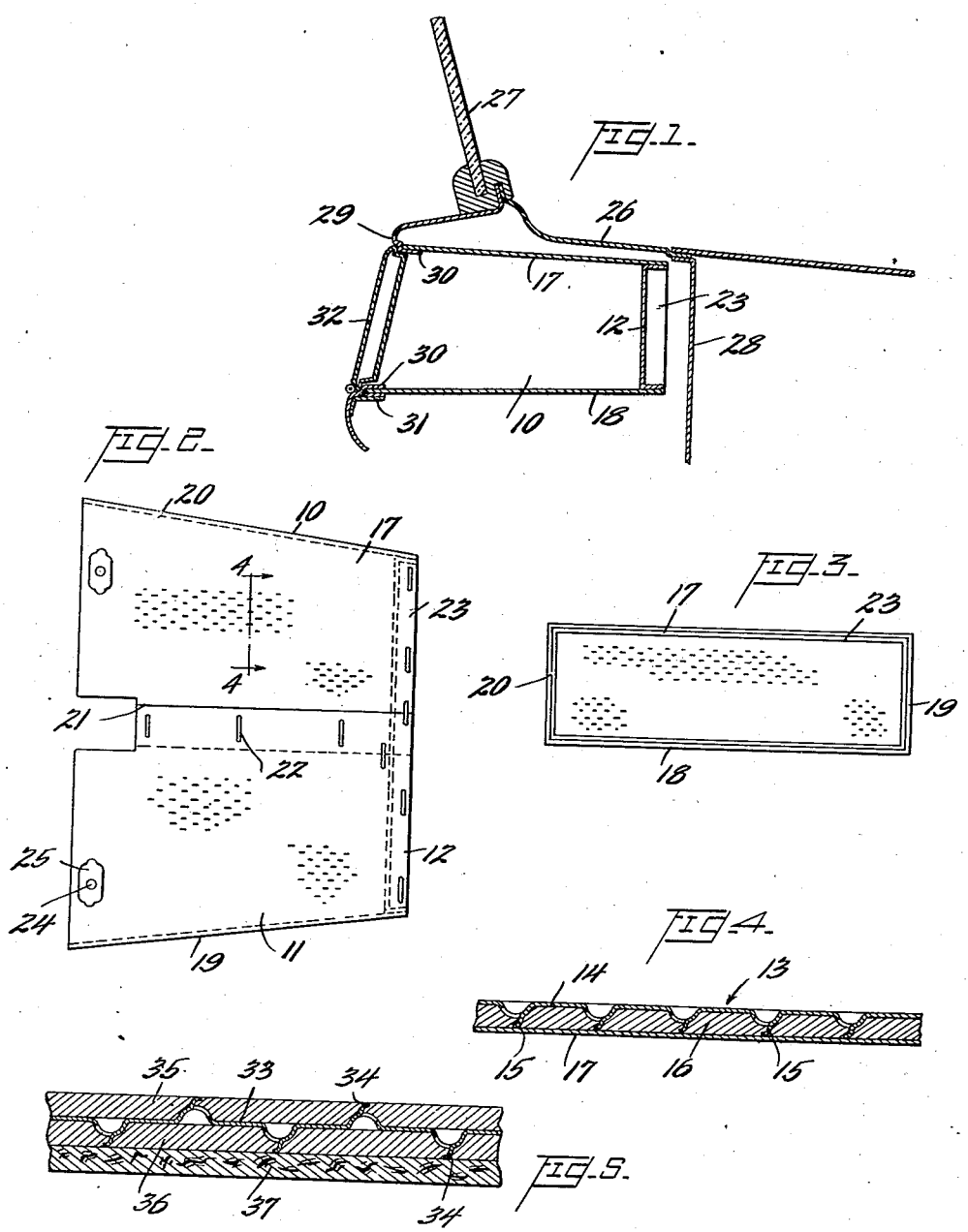

2,298,415

UNITED STATES PATENT OFFICE 2,298,415

GLOVE COMPARTMENT CONSTRUCTION

Frederick G. Richardson and George T. Balfe, Detroit, Mich., assignors to Detroit Gasket & Mfg. Co., Detroit, Mich., a corporation of Michigan Application March 27, 1939, Serial No. 264,429

1 Claim. (Cl. 220—18)

This invention relates to a glove compartment construction for an automobile dash or instrument board.

These compartments are frequently used to contain articles of value, and expensive clocks are often carried by the compartment doors. The doors are provided with substantial locking means, but the body of the compartment is usually formed of cardboard, and petty thieves have found it possible to easily and quickly gain access to the compartments by cutting through the walls with a penknife or other small instrument and remove the contents as well as the clock carried by a compartment door.

It is a particular object of the present invention to remedy this defect by providing a glove compartment having the advantages of lightness and cheapness of manufacture of the cardboard article, but at the same time having the additional characteristic of withstanding puncturing and cutting by the usual pocket or table knife. This result is accomplished by forming the compartment from a laminated material consisting of relatively thin sheet metal having a multiplicity of closely positioned tangs or prongs struck therefrom, and one or more layers of non-metallic material united to the sheet metal layer by the penetration of the tangs into the non-metallic material.

The laminated material formed in this manner is light, cheap to manufacture, and, at the same time, lends itself readily to any scoring, bending or cutting operations necessary to construct the glove compartment. Furthermore, regardless of whether the compartment is formed in separate pieces or from a single blank, this laminated material facilitates the mechanical union of adjacent edges by stapling or riveting.

In the cardboard glove compartments now in use, a cloth lining to match the interior upholstery of the automobile, is usually adhesively secured to the inner surface of the cardboard. In the present device, since the non-metallic layer may be thin cardboard, a cloth lining may be readily secured thereto by adhesive, or, if desired, a surface coating of flock-like material may be adhesively united to the non-metallic layer.

A glove compartment formed in this manner, with a perforated metal sheet, is also far superior to one constructed of flat imperforate metal, since it eliminates the objectionable metallic noise present in constructions formed of flat steel and the like. Furthermore, it would be difficult to adhesively secure a finish lining of cloth or a coating of flock-like material directly to a flat imperforate metal surface.

The present invention therefore has all of the advantages of a glove compartment formed of cardboard or metal and, at the same time, is free of the many disadvantages of compartments formed entirely of one or the other of these materials.

With the foregoing and other objects in view, the invention will now be more fully described, reference being had to the accompanying drawing in which:

Figure 1 is a sectional view of the usual instrument board, cowl and windshield of an automobile with the glove compartment secured in position;

Figure 2 is a top view of one form of the glove compartment;

Figure 3 is an end view thereof;

Figure 4 is an enlarged fragmentary view of one form of the laminated material of which the compartment is constructed; and Figure 5 is an enlarged fragmentary view of another form of the laminated material.

Referring now to Figures 2, 3 and 4, there is disclosed the preferred form of the invention, in which the glove compartment 10 is composed of two sections 11 and 12, respectively. Each section is formed from a laminated material 13 as shown in Figure 4 consisting of a perforated layer of relatively thin sheet metal 14 having a multiplicity of closely arranged tangs 15 struck therefrom. These tangs constitute anchoring means by which a layer of non-metallic material 16 in which they are embedded, as shown, is united to the sheet metal layer to form the laminated material. The tangs 15 penetrate substantially to the outer surface of the layer of non-metallic material in a diagonal direction. It is preferred that the ends of the tangs be maintained within the plane of the non-metallic layer so as to provide a smooth unobstructed surface for receiving a layer of finish material 17, such as cloth or a coating of flock-like material.

The non-metallic layer is formed of board-like material, preferably heavy paper or cardboard, but other similar materials such as fibre board, pressed board, and cork composition may be used.

In forming the section 11 of the compartment, a sheet of the laminated material 13 is cut to the desired size and then scored and bent to form the top and bottom walls 17 and 18 and the side walls 19 and 20. As shown in Figure 2, the side walls gradually taper longitudinally of the compartment and the longitudinal edges 21 forming the top 17 are arranged in overlapping relation and are secured together in any suitable manner as by staples 22.

The section 12 of the compartment is formed from a rectangular piece of material whose edges are first scored to form border portions. The corners of the piece of material are then cut out within the area of the borders and the borders are then bent outwardly at right angles to the body of the sheet to form flanges 23. The section 12 is then inserted into the small end of the pre-formed section 11 and the flanges 23 are then secured as by stapling to the end of the section 11, as clearly shown in Figure 2. Thereafter, if desired, the decorative lining of cloth or a coating of flock-like material 17 is adhesively applied to the inner surface of the non-metallic layer 16.

The open end of the compartment may be provided with suitable holes 24 for facilitating assembly of the compartment in operative position in an automobile. In the present instance, we prefer to strengthen the openings 24 with apertured metal eyelets 25 which cooperate with suitable fastening elements (not shown) to retain the compartment in the position shown in Figure 1. In this view, the numeral 26 designates the cowl, 27 the windshield, 28 the chassis dash or panel, and 29 the instrument board of an automobile.

The instrument board is provided with a substantially rectangular opening of a size corresponding to the open end of the compartment 10 and this opening is bordered by integral flanges 30 forming supporting shelves for the compartment. As shown in Figure 1, the open end of the compartment is slipped over and embraces the flanges 30, which are of sufficient breadth to adequately support the weight of the compartment. As a further means of support, a metal strip 31 may be secured to the lower portion of the instrument board 29 in spaced relation to the lower flange 30 and cooperate therewith to receive and retain the edge of the bottom wall 18 of the compartment. It is to be understood that suitable fastening elements are utilized to secure the compartment to the flanges 30.

Furthermore, any additional means of support may be provided for the compartment, although we have found that the combination of the flanges and fastening means is sufficient, since the laminated structure of which the compartment is formed is capable of withstanding considerable strain and will not tear away from the flanges 30 because of the weight imposed by articles placed in the compartment.

A hinged door or closure 32 is secured to the instrument board and any suitably locking means (not shown) may be employed to lock the door against unauthorized entry into the compartment.

By reason of the construction just described, the exterior of the wall of the compartment consists of a metal layer which forms a substantial armor against unauthorized access through the medium of a penknife or other small cutting tool. The construction has been found to substantially reduce difficulty heretofore experienced with the relatively slight cardboard walls, and, in addition, possesses all of the advantages heretofore above set forth.

Referring now to Figure 5, there is illustrated a fragmentary view of a modified form of the laminated material. In this form of the invention, the perforated metal layer 33 is provided with a multiplicity of closely arranged tangs 34 struck up upon opposite sides of the layer and are embedded in layers 35 and 36 of the non-metallic material whereby the latter are secured to opposite sides of the metal layer. This material may be made up into a glove compartment, as above described, and a lining or cloth or flock-like material adhesively secured to one or other of the layers 35 or 36 depending upon which one constitutes the interior surface of the compartment. Referring to Figure 5, in some cases a layer 37 formed of a comminuted cork composition is adhesively secured to one of the layers 35—36. This layer is preferably applied to the inside facing layer 36 and a decorative lining is, in turn, adhesively secured to the cork layer 37.

The invention may be modified with respect to its shape, and the manner of securing the walls of the compartment together, it being understood that any suitable securing means may be employed. Various changes and modifications may be made in the construction illustrated and described but such changes as come within the scope of the invention are considered to be included in the appended claim.

We claim:

A vehicle glove compartment adapted to be secured behind the dash of the vehicle and having a body wall and one end wall, the other end being open whereby to be positioned immediately behind the dashboard, said body wall being formed from laminated material comprising a layer of thin sheet metal having a multiplicity of closely arranged tangs struck therefrom with a perforation adjacent each tang and a substantially coextensive layer of sound deadening and lining non-metallic board-like material united to the inner side of the metal layer by the tangs, said layer having the tangs embedded therein and overlying said perforations, the wall being formed by bending the laminated material to glove box shape and having means adjacent said open end for securing the compartment in position with the open end immediately behind a vehicle dashboard.

FREDERICK G. RICHARDSON.
GEORGE T. BALFE.